United States Patent
Nalliah et al.

(10) Patent No.: US 9,741,019 B2
(45) Date of Patent: Aug. 22, 2017

(54) RESTORING DELETED ITEMS WITH CONTEXT

(71) Applicant: Microsoft Technology Licensing, LLC, Redmond, WA (US)

(72) Inventors: Selvaraj Nalliah, Redmond, WA (US); Edward Thomas Banti, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/221,086

(22) Filed: Jul. 27, 2016

(65) Prior Publication Data

US 2016/0337298 A1 Nov. 17, 2016

Related U.S. Application Data

(63) Continuation of application No. 13/330,131, filed on Dec. 19, 2011, now Pat. No. 9,536,227.

(51) Int. Cl.
*G06F 15/16* (2006.01)
*G06Q 10/10* (2012.01)
(Continued)

(52) U.S. Cl.
CPC ....... *G06Q 10/107* (2013.01); *G06Q 10/1093* (2013.01); *H04L 51/22* (2013.01); *G06F 11/1458* (2013.01); *G06F 11/1469* (2013.01)

(58) Field of Classification Search
CPC ............... G06Q 10/107; G06F 11/1469; G06F 11/1458; H04L 51/22
(Continued)

(56) References Cited

U.S. PATENT DOCUMENTS 5,555,346 A 9/1996 Gross et al.
5,890,163 A 3/1999 Todd
(Continued)

FOREIGN PATENT DOCUMENTS

CN 101188579 A 5/2008
CN 101287190 A 10/2008
(Continued)

OTHER PUBLICATIONS

U.S. Appl. No. 13/330,114, Amendment and Response filed Jan. 9, 2017, 16 pages.
(Continued)

*Primary Examiner* — Liangche A Wang
*Assistant Examiner* — Johnny Aguiar

(57) ABSTRACT

Deleted property information relating to deleting an item, such as an electronic message, is used for restoring the deleted item. The deleted property information is stored in response to deleting the item. The stored deleted property information identifies a location of where the item was deleted from and may include other information. The location information may be a specific location such as a folder (e.g. inbox, sent, folder 1, . . . ), a calendar, a network location, and the like. In response to a request to restore a deleted item, the deleted property information is used to restore the deleted item to the location where the item was when deleted. A graphical user interface may be used to assist a user in restoring deleted items. The user interface may display a user friendly name (e.g. "Inbox", "Folder 1", . . . ) of where the deleted item(s) will be/have been restored.

19 Claims, 9 Drawing Sheets

(51) Int. Cl.
*H04L 12/58* (2006.01)
*G06F 11/14* (2006.01)

(58) Field of Classification Search
USPC .............. 709/204, 205, 206, 207, 223, 224
See application file for complete search history.

(56) References Cited

U.S. PATENT DOCUMENTS

| | | |
|---|---|---|
| 6,311,210 B1 | 10/2001 | Foladare |
| 7,216,114 B2 | 5/2007 | Hendricks |
| 7,558,928 B1 | 7/2009 | DeVos |
| 7,676,689 B1 | 3/2010 | Shioyama |
| 7,783,706 B1 | 8/2010 | Robinson |
| 7,970,842 B2 | 6/2011 | Cama |
| 8,332,442 B1 | 12/2012 | Greene |
| 8,645,456 B2 | 2/2014 | Li et al. |
| 2002/0083064 A1 | 6/2002 | Davis et al. |
| 2002/0089543 A1 | 7/2002 | Ostergaard |
| 2002/0163539 A1 | 11/2002 | Srinivasan |
| 2002/0165898 A1 | 11/2002 | Duffy et al. |
| 2002/0167905 A1 | 11/2002 | Wenzel et al. |
| 2003/0033271 A1 | 2/2003 | Hendricks |
| 2005/0004978 A1 | 1/2005 | Reed et al. |
| 2005/0004989 A1 | 1/2005 | Satterfield |
| 2005/0015451 A1 | 1/2005 | Sheldon |
| 2005/0177869 A1 | 8/2005 | Savage |
| 2005/0234943 A1 | 10/2005 | Clarke |
| 2005/0251555 A1 | 11/2005 | Little, II |
| 2006/0010221 A1 | 1/2006 | Srinivasan |
| 2006/0031357 A1 | 2/2006 | Misra et al. |
| 2006/0143274 A1 | 6/2006 | Schulz |
| 2006/0218233 A1 | 9/2006 | Greve et al. |
| 2006/0235933 A1 | 10/2006 | Baluja |
| 2006/0282784 A1 | 12/2006 | Taylor |
| 2006/0288044 A1 | 12/2006 | Kashiwagi et al. |
| 2007/0022213 A1 | 1/2007 | Fahmy |
| 2007/0028063 A1 | 2/2007 | Hars |
| 2007/0064899 A1 | 3/2007 | Boss |
| 2007/0067399 A1 | 3/2007 | Kulkarni |
| 2007/0077925 A1 | 4/2007 | Hiyama |
| 2007/0078938 A1 | 4/2007 | Hu |
| 2007/0192416 A1 | 8/2007 | Gupta |
| 2007/0208780 A1 | 9/2007 | Anglin |
| 2008/0010350 A1 | 1/2008 | Chen |
| 2008/0027909 A1 | 1/2008 | Gang et al. |
| 2008/0075056 A1 | 3/2008 | Thome |
| 2008/0095336 A1 | 4/2008 | Tysowski |
| 2008/0177850 A1 | 7/2008 | Piccinini |
| 2008/0189259 A1 | 8/2008 | Kapur |
| 2008/0294730 A1 | 11/2008 | Oral et al. |
| 2008/0301245 A1 | 12/2008 | Estrada et al. |
| 2008/0305813 A1 | 12/2008 | Rao |
| 2008/0313296 A1 | 12/2008 | Muller |
| 2008/0320417 A1 | 12/2008 | Begley |
| 2009/0024668 A1 | 1/2009 | Bildhaeuser |
| 2009/0024952 A1 | 1/2009 | Brush et al. |
| 2009/0089391 A1 | 4/2009 | Garrett |
| 2009/0144392 A1 | 6/2009 | Wang et al. |
| 2009/0144535 A1 | 6/2009 | Lin |
| 2009/0164637 A1 | 6/2009 | Tanimoto |
| 2009/0182819 A1 | 7/2009 | Krantz |
| 2009/0248602 A1 | 10/2009 | Frazier |
| 2010/0082751 A1 | 4/2010 | Meijer et al. |
| 2010/0145918 A1 | 6/2010 | Stata |
| 2010/0146056 A1 | 6/2010 | Consul |
| 2010/0149300 A1 | 6/2010 | Zubas |
| 2010/0169429 A1 | 7/2010 | O'Sullivan |
| 2010/0281141 A1 | 11/2010 | Morohashi |
| 2011/0010182 A1 | 1/2011 | Turski |
| 2011/0040730 A1 | 2/2011 | Belea |
| 2011/0055294 A1 | 3/2011 | Noma |
| 2011/0196892 A1 | 8/2011 | Xia |
| 2011/0213845 A1 | 9/2011 | Logan |
| 2011/0246418 A1 | 10/2011 | Piwonka |
| 2011/0255672 A1 | 10/2011 | Moore |
| 2011/0261395 A1 | 10/2011 | Kim |
| 2011/0296043 A1 | 12/2011 | Sutton |
| 2012/0092346 A1 | 4/2012 | Ording et al. |
| 2012/0124507 A1 | 5/2012 | Paterson |
| 2012/0136945 A1 | 5/2012 | Lee |
| 2012/0149350 A1 | 6/2012 | Fan et al. |
| 2012/0259927 A1 | 10/2012 | Lockhart |
| 2012/0324002 A1 | 12/2012 | Chen |
| 2013/0041912 A1 | 2/2013 | Arora |
| 2013/0110992 A1 | 5/2013 | Ravindra |
| 2013/0159405 A1 | 6/2013 | Nalliah |

FOREIGN PATENT DOCUMENTS

| | | |
|---|---|---|
| CN | 101340398 A | 1/2009 |
| CN | 1700341 A | 3/2010 |
| CN | 101729442 A | 6/2010 |
| CN | 101097577 B | 12/2010 |
| CN | 102067107 A | 5/2011 |
| CN | 102148770 A | 8/2011 |
| CN | 102231735 A | 11/2011 |
| CN | 102238107 A | 11/2011 |
| EP | 2337276 A1 | 6/2011 |
| KR | 10-2009-0103594 | 10/2009 |
| KR | 10-2009-0121760 | 11/2009 |
| RU | 2374681 | 11/2009 |
| TW | I346879 | 8/2011 |
| WO | 2010068741 | 6/2010 |

OTHER PUBLICATIONS

Japanese Notice of Allowance in Application 2014-549127, mailed Dec. 15, 2016, 3 pages. (No English Translation.).
Russian Notice of Allowance in Application 2014124929, mailed Dec. 5, 2016, 9 pages. (No English Translation.).
Chinese Office Action in Application 201210552294.X, mailed Nov. 14, 2016, 11 pages.
European Office Action in Application 12858774.8, mailed Jan. 5, 2017, 9 pages.
"Configuring Zoho Mail Add on", Retrieved on: Oct. 7, 2011, Available at: http://zohocrm.wiki.zoho.com/Configuring-Zoho-Mail-Addon.html.
"How do I share a mail folder, other than my inbox, in Exchange?", Retrieved on: Oct. 7, 2011, Available at: http://www.inf.aber.ac.uk/advisory/faq/507.
"Outlook 2003—Recover Deleted Items", obtained online on Dec. 23, 2014 at: http://www.lse.ac.uk/intranet/LSEServices/IMT/guides/softwareGuides/office2003outloo . . . , 3 pgs.
"Teach Yourself Windows 98 Visually", © 1998 by MaranGraphics Inc., Published by IDG Books Worldwide Inc., p. 91, 2 pages total.
"Zimbra Web Client User Guide", Dec. 1, 2009, located at: http://files.zimbra.com/website/docs/ZWC%20End%20User%20Guide%20for%206.0.pdf, 19 pgs.
Chinese 1st Office Action and Search Report in Application 201210552358.6, mailed Aug. 3, 2015, 12 pgs.
Chinese 1st Office Action in Application 201210552294.X, mailed Jan. 26, 2015, 14 pgs.
Chinese 2nd Office Action in Application 201210552294.X, mailed Oct. 10, 2015, 11 pgs.
Chinese 2nd Office Action in Application 201210552358.6, mailed Mar. 10, 2016, 10 pages.
Chinese 3rd Office Action in Application 201210552294.X, mailed Apr. 22, 2016, 17 pgs.
Chinese Notice of Allowance in Application 201210552358.6, mailed Aug. 5, 2016, 3 pgs.
Elkins, M.; "The Mutt E-Mail Client", Retrieved on: Oct. 7, 2011, Available at: http://www.mutt.org/doc/manual/manual.html.
European Communication in Application 12858774.8, mailed Jun. 18, 2015, 1 page.
European Communication in Application 12861004.5, mailed Jul. 21, 2015, 1 page.
European Extended Search Report in Application 12858774.8, mailed May 13, 2015, 9 pgs.

(56) References Cited

OTHER PUBLICATIONS

European Extended Search Report in Application 12861004.5, mailed Jul. 3, 2015, 7 pgs.
International Search Report mailed Mar. 27, 2013, in PCT/US2012/068843.
International Search Report mailed Mar. 29, 2013, in PCT/US2012/069033.
Kerio.com; "Folder Administration", Retrieved on: Oct. 4, 2011, Available at: http://manuals.kerio.com/kmsug/en/sect-folders.html.
Lux Scientiae, Incorporated; "Share Email and Share Folders", Retrieved on: Oct. 7, 2011, Available at: http://luxsci.com/extranet/info/sharing.html.
Migration2007; "Email Migration 2007—Outlook Web Access"; accessed Oct. 5, 2011 at http://migration2007.wiki.otago.ac.nz/Outlook_Web_Access; 16 pgs.
Mimosa Systems; "NearPoint for Microsoft Exchange Server"; 2010; accessed Oct. 4, 2011 at http://www.polk-fl.net/staff/technology/helpdesk/documents/EA-UserGuide.pdf ; 78 pgs.
Office Action mailed Apr. 10, 2013, in U.S. Appl. No. 13/330,053, 12 pgs.
Office Action mailed Feb. 13, 2014, in U.S. Appl. No. 13/330,131, 36 pgs.
Office Action mailed Jan. 3, 2014, in U.S. Appl. No. 13/330,114, 32 pgs.
Office Action mailed Jul. 11, 2013, in U.S. Appl. No. 13/330,114, 28 pgs.
Office Action mailed Jul. 11, 2013, in U.S. Appl. No. 13/330,131, 32 pgs.
Office Action mailed Oct. 21, 2013, in U.S. Appl. No. 13/330,053, 13 pgs.
Office Action mailed Sep. 12, 2013, in U.S. Appl. No. 13/330,081, 10 pgs.
Osuna, A., et al.; "Microsoft Exchange Recovery Using N series Snapshots"; IBM; Jul. 7, 2008; 16 pgs.
Ramendik, Mikhail, "The FreeDesktop.org Trash Specification", Apr. 12, 2005, http://www.ramendik.ru/docs/trashpec.html, 10 pgs.
Riggs, Jim, "True Preview", Aug. 21, 2009, 1 page.
SearchExchange.com; "Email, Messaging and Collaboration Clients"; accessed Oct. 5, 2011 at http://searchexchange.techtarget.com/feature/Exchange-Server-backup-and-recovery-FAQs; 21 pgs.
Shareo.com; "ShareO for Microsoft Outlook", Retrieved on: Oct. 7, 2011, Available at: http://www.shareo.com/.
Sharewareconnection.com; "Recovery My Email for Outlook Express"; accessed Oct. 5, 2011 at http://www.sharewareconnection.com/recovery-my-email-for-outlook-express.htm; 3 pgs.
SonicWALL; "SonicWALL Recovery Manager for Exchange 4.9"; Mar. 18, 2011; 26 pgs.
Taiwan Notice of Allowance in Application 101140108 mailed Mar. 17, 2016, 4 pages.
The Productivity Hub; "Use Outlook Reading Pane without marking messages as read"; May 13, 2010; 1 pg.
U.S. Appl. No. 13/330,053, filed Dec. 19, 2011, entitled "Stealth mode for interacting with electronic messages"; Banti, et al.
U.S. Appl. No. 13/330,081, filed Dec. 19, 2011, entitled "Performing operations on deleted items using deleted property information"; Banti, et al.
U.S. Appl. No. 13/330,114, filed Dec. 19, 2011, entitled "Sharing and transferring message content between users"; Nalliah, et al.
U.S. Appl. No. 13/330,131, filed Dec. 19, 2011, entitled "Restoring deleted items with context"; Nalliah, et al.
U.S. Appl. No. 13/330,053, Amendment and Response filed Jan. 4, 2016, 11 pgs.
U.S. Appl. No. 13/330,053, Amendment and Response filed Oct. 17, 2014, 13 pgs.
U.S. Appl. No. 13/330,053, Amendment and Response filed Mar. 21, 2014, 13 pgs.
U.S. Appl. No. 13/330,053, Amendment and Response filed May 11, 2015, 12 pgs.
U.S. Appl. No. 13/330,053, Amendment and Response filed Jul. 10, 2013, 9 pgs.
U.S. Appl. No. 13/330,053, Amendment and Response filed Aug. 28, 2015, 11 pgs.
U.S. Appl. No. 13/330,053, Office Action mailed Oct. 2, 2015, 12 pgs.
U.S. Appl. No. 13/330,053, Office Action mailed Feb. 11, 2015, 13 pgs.
U.S. Appl. No. 13/330,053, Office Action mailed Mar. 7, 2016, 12 pages.
U.S. Appl. No. 13/330,053, Office Action mailed Jun. 17, 2015, 12 pgs.
U.S. Appl. No. 13/330,053, Office Action mailed Jul. 17, 2014, 14 pgs.
U.S. Appl. No. 13/330,081, Amendment and Response filed Jan. 8, 2016, 12 pages.
U.S. Appl. No. 13/330,081, Amendment and Response filed Mar. 12, 2014, 11 pgs.
U.S. Appl. No. 13/330,081, Amendment and Response filed Apr. 22, 2015, 10 pgs.
U.S. Appl. No. 13/330,081, Amendment and Response filed Jul. 19, 2016, 12 pgs.
U.S. Appl. No. 13/330,081, Amendment and Response filed Aug. 28, 2014, 10 pgs.
U.S. Appl. No. 13/330,081, Amendment and Response filed Sep. 17, 2015, 12 pgs.
U.S. Appl. No. 13/330,081, Office Action mailed Jan. 22, 2015, 11 pgs.
U.S. Appl. No. 13/330,081, Office Action mailed Oct. 8, 2015, 12 pgs.
U.S. Appl. No. 13/330,081, Office Action mailed Apr. 19, 2016, 14 pages.
U.S. Appl. No. 13/330,081, Office Action mailed Jun. 13, 2014, 12 pgs.
U.S. Appl. No. 13/330,081, Office Action mailed Jul. 1, 2015, 12 pgs.
U.S. Appl. No. 13/330,114, Amendment and Response filed Feb. 9, 2016, 17 pages.
U.S. Appl. No. 13/330,114, Amendment and Response filed Jan. 2, 2015, 12 pgs.
U.S. Appl. No. 13/330,114, Amendment and Response filed Dec. 11, 2013, 9 pgs.
U.S. Appl. No. 13/330,114, Amendment and Response filed Apr. 3, 2014, 12 pgs.
U.S. Appl. No. 13/330,114, Amendment and Response filed Apr. 9, 2015, 13 pgs.
U.S. Appl. No. 13/330,114, Amendment and Response filed Jul. 18, 2016, 15 pgs.
U.S. Appl. No. 13/330,114, Amendment and Response filed Sep. 10, 2015, 13 pgs.
U.S. Appl. No. 13/330,114, Office Action mailed Jan. 23, 2015, 31 pgs.
U.S. Appl. No. 13/330,114, Office Action mailed Oct. 2, 2014, 31 pgs.
U.S. Appl. No. 13/330,114, Office Action mailed Oct. 9, 2015, 36 pgs.
U.S. Appl. No. 13/330,114, Office Action mailed Mar. 17, 2016, 37 pages.
U.S. Appl. No. 13/330,114, Office Action mailed Jun. 10, 2015, 30 pgs.
U.S. Appl. No. 13/330,114, Office Action mailed Sep. 8, 2016, 25 pgs.
U.S. Appl. No. 13/330,131, Amendment and Response filed Jan. 19, 2016, 14 pages.
U.S. Appl. No. 13/330,131, Amendment and Response filed Jan. 8, 2015, 13 pgs.
U.S. Appl. No. 13/330,131, Amendment and Response filed Jan. 9, 2014, 10 pgs.
U.S. Appl. No. 13/330,131, Amendment and Response filed May 4, 2015, 13 pgs.
U.S. Appl. No. 13/330,131, Amendment and Response filed May 8, 2014, 14 pgs.
U.S. Appl. No. 13/330,131, Amendment and Response filed Sep. 25, 2015, 12 pgs.

(56) References Cited

OTHER PUBLICATIONS

U.S. Appl. No. 13/330,131, Notice of Allowance mailed Mar. 15, 2016, 14 pages.
U.S. Appl. No. 13/330,131, Notice of Allowance mailed Aug. 19, 2016, 5 pages.
U.S. Appl. No. 13/330,131, Office Action mailed Oct. 19, 2015, 30 pgs.
U.S. Appl. 13/330,131, Office Action mailed Oct. 9, 2014, 25 pgs.
U.S. Appl. No. 13/330,131, Office Action mailed Feb. 4, 2015, 26 pgs.
U.S. Appl. 13/330,131, Office Action mailed Jun. 25, 2015, 27 pgs.
Ventia Pty Limited; "DeskNow", Published on: Dec. 29, 2006, Available at: http://www.desknow.com/downloads/DeskNow%20-%20User%20Manual.pdf.
Web Developers Notes; "Outlook Express Inbox Folders—Sorting and Organizing Your Emails", Retrieved on: Oct. 5, 2011, Available at: http://www.webdevelopersnotes.com/tips/internet/outlook_express_inbox_folders.php.
Williams, R.; "A Simple Useful Modification to MS Outlook's Deleted Items Folder"; TechBetter Jan. 17, 2008; accessed Oct. 5, 2011 at http://www.accountingweb.com/item/104487; 3 pgs.
U.S. Appl. No. 13/330,131, Notice of Allowance mailed Oct. 31, 2016, 3 pgs.
Chinese 4th Office Action in Application 201210552294.X, mailed Aug. 15, 2016, 12 pgs.
Russian Office Action in Application 2014124929, mailed Sep. 1, 2016, 6 pgs.
U.S. Appl. No. 13/330,114, Office Action mailed Mar. 17, 2017, 17 pgs.
Mexican Office Action in Application MX/a/2014/007162, mailed Jan. 25, 2017, 5 pgs.
U.S Appl. No. 13/330,081, Office Action dated May 22, 2017, 10 pgs.

RESTORING DELETED ITEMS WITH CONTEXT

CROSS-REFERENCE TO RELATED APPLICATIONS

This application is a continuation application of U.S. patent application Ser. No. 13/330,131, entitled "RESTORING DELETED ITEMS WITH CONTEXT," filed on Dec. 19, 2011, the entire disclosure of which is hereby incorporated herein by reference.

BACKGROUND

Users commonly view electronic messages and perform other operations on electronic messages (e.g. forwarding, replying, marking urgent, moving, deleting . . . ). When a user deletes an electronic message, the electronic message may be moved to a deleted items folder. While the user may remove an electronic message from the deleted items folder, they may not remember where the message was originally located.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Deleted property information relating to deleting an item, such as an electronic message, is used for restoring the deleted item. The deleted property information is stored in response to deleting the item. The stored deleted property information identifies a location of where the item was deleted from and may include other information. The location information may be a specific location such as a folder (e.g. inbox, sent, folder 1, . . . ), a calendar, a network location, and the like. In response to a request to restore a deleted item, the deleted property information is used to restore the deleted item to the location where the item was when deleted. A graphical user interface may be used to assist a user in restoring deleted items. The user interface may display a user friendly name (e.g. "Inbox", "Folder 1", . . . ) of where the deleted item(s) will be/have been restored.

DETAILED DESCRIPTION

Figure 1:
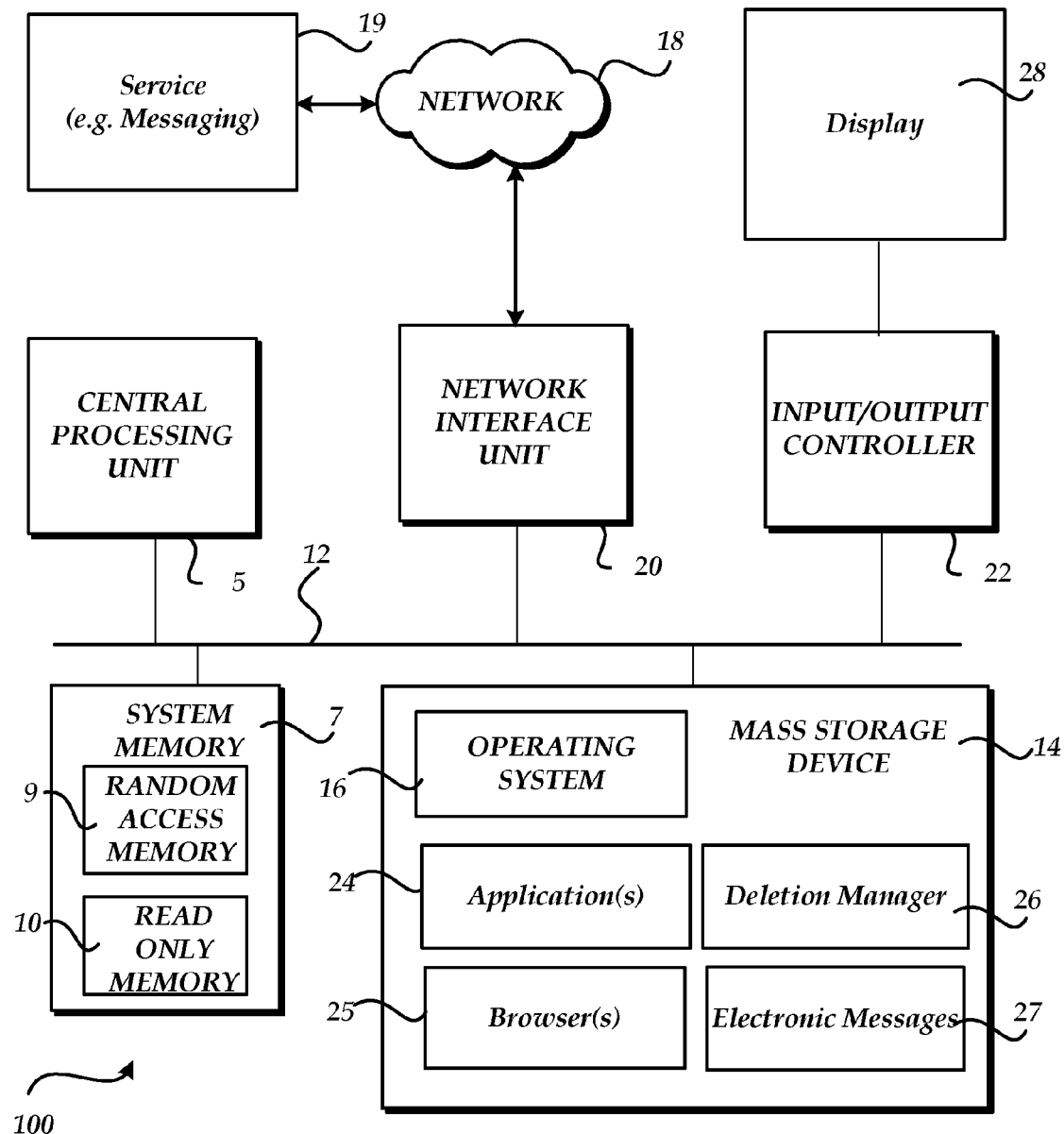
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, electronic messages 27, and other program modules, such as Web browser 25, and deletion manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS 7®, WINDOWS SERVER® operating systems from MICROSOFT CORPORATION of Redmond, Wash.

The mass storage device 14 and RAM 9 may also store one or more program modules. In particular, the mass storage device 14 and the RAM 9 may store one or more applications, such as deletion manager 26, messaging application(s) 24 (e.g. a messaging application such as MICROSOFT OUTLOOK, an Instant Messaging (IM) application, an SMS message, and the like), and may store one or more Web browsers 25. The Web browser 25 is operative to request, receive, render, and provide interactivity with electronic content, such as Web pages, electronic messages, videos, documents, and the like. According to an embodiment, the Web browser comprises the INTERNET EXPLORER Web browser application program from MICROSOFT CORPORATION.

Deletion manager 26 may be located on a client device and/or on a server device (e.g. within service 19). Deletion manager 26 may be configured as an application/process and/or as part of a cloud based multi-tenant service that provides resources (e.g. services, data . . . ) to different tenants (e.g. MICROSOFT OFFICE 365).

Generally, deletion manager 26 is configured to perform operations relating to storing deleted property information and performing actions using the deleted property information. Deleted property information relating to deleting an item, such as an electronic message, is obtained by deletion manager 26 and stored for later use. The stored deleted property information may relate to one or more different properties that are associated with the deletion of the item. The stored deleted property information identifies a location of where the item was deleted from and may include other information. The location information may be a specific location such as a folder (e.g. inbox, sent, folder 1, . . . ), a calendar, a network location, and the like. In response to a request to restore a deleted item, the deleted property information is used to restore the deleted item to the location where the item was when deleted. A graphical user interface may be used to assist a user in restoring deleted items. The user interface may display a user friendly name (e.g. "Inbox", "Folder 1", . . . ) of where the deleted item(s) will be/have been restored. Additional details regarding the operation of deletion manager 26 will be provided below.

Figure 2:
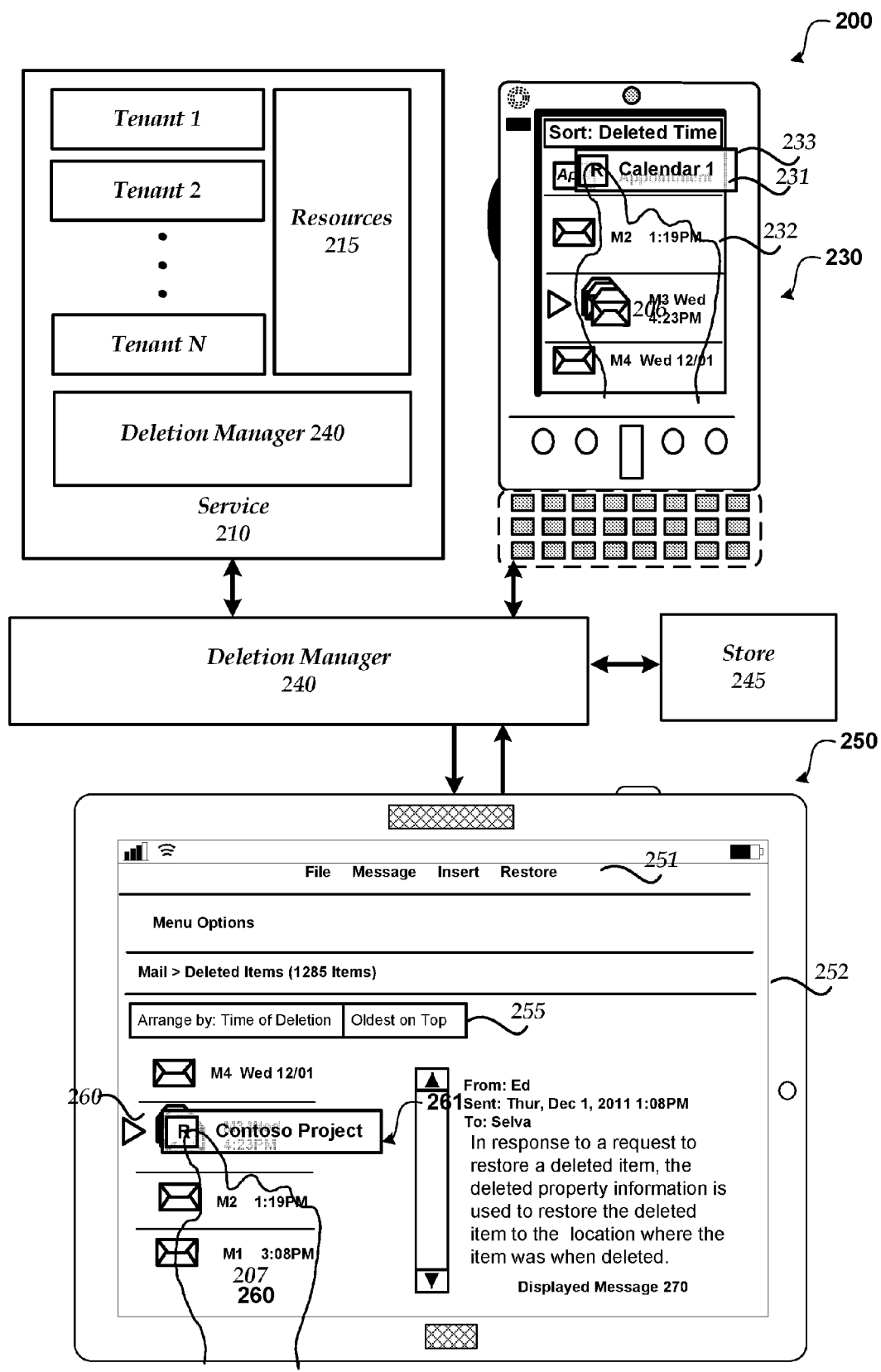
FIG. 2 illustrates an exemplary system using deleted property information for restoring electronic messages.

FIG. 2 illustrates an exemplary system using deleted property information for restoring electronic messages. As illustrated, system 200 includes service 210, deletion manager 240, store 245, touch screen input device/display 250 (e.g. slate) and mobile device 230, such as a smartphone.

As illustrated, service 210 is a cloud based and/or enterprise based service that may be configured to provide electronic messaging services (e.g. MICROSOFT OFFICE 365 or some other cloud based/online service that provides messaging services). Functionality of one or more of the services/applications provided by service 210 may also be configured as a client based application. For example, a client device may include an application that performs operations relating to sending/receiving/interacting with electronic messages and deleted items, such as email messages. The messaging application/service may also provide messaging services relating to other types of messages (e.g. IM messages, SMS, MMS, and the like) Although system 200 shows a messaging service, other services/applications may be configured to use deleted property information to interact with deleted items.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data.

System 200 comprises a touch screen input device/display 250 (e.g. a slate/tablet device) and mobile device 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 and mobile device 230 show an exemplary display 252/232 of deleted electronic messages. Electronic messages (deleted and non-deleted) may be stored on a device (e.g. mobile device 230, slate 250 and/or at some other location (e.g. network store 245). Mobile device 230 shows display 232 illustrating deleted email messages shown in a list view that are ordered based on a time each email was deleted. Mobile device 230 shows the deleted messages arranged from most recently deleted to oldest deleted. The electronic messages may be displayed by an email program, a text messaging program, an Instant Messaging program, a messaging service, and the like. The messages may be displayed in a list, arranged as threads, and/or arranged in different manners. The messages may be displayed by a client based application and/or by a server based application (e.g. enterprise, cloud based).

Slate 250 shows a user 206 selecting to sort messages from oldest deleted to most recently deleted (255).

Deletion manager 240 is configured to perform operations relating to storing deleted property information and using the stored deleted property information to interact with and to restore deleted messages and/or other content. The deleted property information may be used with different types of operations such as restoring one or more deleted messages. Other operations may include: sorting deleted items using the deleted property information; filtering the deleted items using the deleted property information, triggering one or more rules using the deleted property information; and the like. All/portion of the deleted property information that is associated with each of the deleted message may be accessed depending on the requested operation. For example, the location of where the item was deleted from may be used when restoring an item and the time of deletion for each deleted item may be used to sort the deleted items.

Deletion manager 240 is also configured to determine when an item is deleted and what information to store in response to the deletion of an item. For example, one or more of the following may be determined and stored: a time of deletion; a device used to delete the item; a device where the deleted item was stored; and a location where a user was when the item was deleted. Other deletion information may also be stored (e.g. application associated with the deleted item, application last used to access the deleted item, . . . ).

In response to deleting an item, deletion manager 240 stores the location of where the item was deleted. According to an embodiment, the location is stored as a property of the electronic message being deleted. The location may include a user friendly name "e.g. Folder 1, Inbox, Project Alpha, Ed's calendar and the like." The location may be a link to a location and or some other identifier to the location. The term "link" refers to an address that represents a location of content. For example, a link may be in the form of a Uniform Resource Locator (URL) that specifies a network location of where the content is stored. Selecting the link generally retrieves the content that is pointed to by the link.

As illustrated, mobile device 230 shows a user selecting an item (calendar appointment 231) to restore. In response to selecting a message to restore, UI 231 may be displayed that allows a user to see the location of where the deleted item will be restored. In the current example, deleted item 231 will be restored to Calendar 1 when the user selects to restore the deleted item 231 (e.g. selecting the R option).

Slate 250 shows a user selecting an item (messages 260) that is a thread and comprises more than one message to restore. In response to selecting the thread to restore, UI 261 may be displayed that allows a user to see the location of where the deleted thread and its content will be restored. In the current example, deleted item 260 will be restored to Contoso Project when the user selects to restore the deleted item 260 (e.g. selecting the R option).

Figure 3:
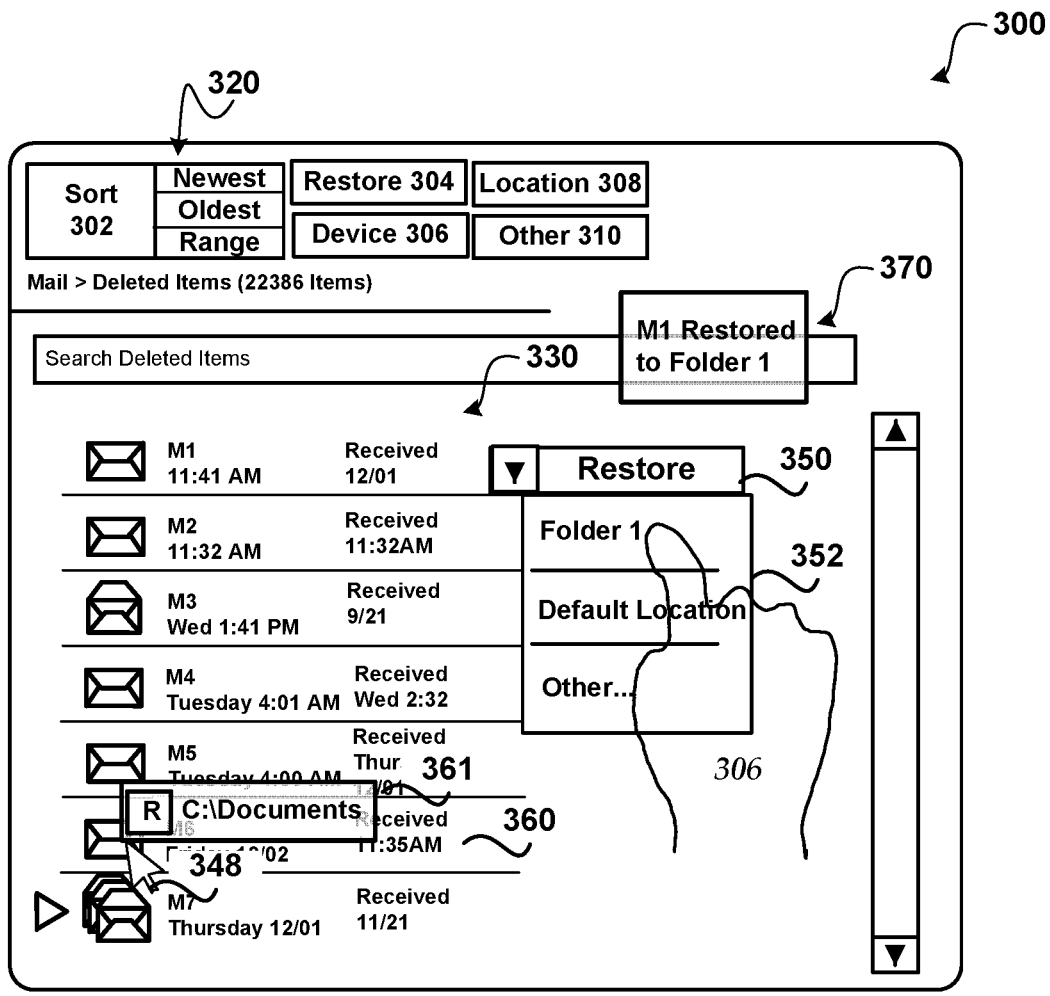
FIG. 3 shows a display illustrating a messaging window that shows a user interacting with electronic messages that were deleted and restoring one or more of the messages.

FIG. 3 shows a display illustrating a messaging window that shows a user interacting with electronic messages that were deleted and restoring one or more of the messages. As illustrated, window 300 includes a message list 330. More or fewer areas may be included within window 300. For example, window 300 may include a folder list and a preview area. A folder list may be used to show different folders that may be selected to populate message list 330 (e.g. selecting a deleted items folder to show deleted items). A preview area (See FIG. 2) may be used to show message content that is associated with a selected message/message thread. A graphical indicator, such as an icon and/or coloring/highlighting, may be displayed to indicate a selected message.

Window 300 may be a window that is associated with a desktop application, a mobile application and/or a web-based application (e.g. displayed by a browser). For example, a web browser may access an electronic mail service, an email application on a computing device may be configured to compose/send/receive emails from one or more different services, and the like.

Message list 330 shows a list of the deleted items. The messages illustrated within message list may be sorted/filtered in different manners. A user may use User Interface (UI) options 320 to specify the values used for determining the deleted messages to show within message list 320 and/or their ordering. For example, the messages may be sorted 302 based on: the most recently deleted (newest) to oldest deleted by date; the oldest deleted to the newest deleted; and a range of dates may be specified. The messages may also be filtered based on a device 306 from which the item was deleted, a device 306 from which the item was stored, and a location 308 where the user was located when the item was deleted. Deleted items may also be restored using restore option 304. A user may specify that they would like items restored that were deleted within a predetermined time period (e.g. last 2 hours), deleted from a particular device, deleted from a particular location, deleted while the user was at a particular location and/or any combination using the deleted property information.

As illustrated, the deleted messages in message list 330 are displayed in order of the most recently deleted. Message list 330 shows single messages and message threads. The messages in message thread may be expanded by selecting the expand/collapse icon before the message thread. In the current example, the time of deletion for each message is displayed beneath the message identifier and a time the message was received is displayed underneath the Received heading. For example, message M1 was deleted at 11:41 AM and received on December 1, message M2 was deleted at 11:32 and received at 11:32 AM, message M3 was deleted Wednesday at 1:41 PM and received on September 21, and so on. As can be seen, even though a message may have been received earlier than a previous message, the ordering of the deleted messages within message list 330 is based on the time of deletion (most recently deleted to oldest deleted) and is not sorted based on the received time of the message. As such, a user may be able to more easily locate the recently deleted items. The user may also sort the deleted messages on other properties, such as the received time.

One or more user interfaces of one or more types may be used to interact with the deleted electronic messages. For example, UI 320 may provide different options, context menu 350 may be used, interface 361 may be used, a menu within a menu bar, a menu item selected from a ribbon user interface, a graphical menu, and the like. In the current example, menu 320, a context menu 350 and menu 360 are illustrated. User interface (UI) elements 320, 350 and 360 may be used when restoring deleted messages. Generally, the UIs are configured such that a user may easily interact with content and electronic messages. For example, a user may simply select an option within UI 320, 350, 361 to restore a deleted electronic message. Zero or more options may be displayed. For example, the option may be a single restore option that when selected restores the deleted electronic message such as displayed in user interface 361. The restore UI may also include other options such as shown in context menu 350. As illustrated, options 352 show the original location of the message where is was deleted from (Folder 1), a default location (e.g. the Inbox and/or some other predefined location) and an "Other" selection that allows a user to specify the location where to restore the option. In the current example, user 306 has selected "Folder 1" to restore deleted message M1.

UI 360 shows another exemplary UI element that may be used when restoring a deleted electronic message. In response to a user hovering over a deleted message, UI 360 is displayed that provides an option to restore the message (R) and shows the location where the deleted message will be restored. According to an embodiment, the menu is displayed alpha blended such that a portion of the content beneath the display of the menu 360 remains visible.

UI 370 may be displayed in response to an item being restored. UI 370 may be displayed for a predetermined period of time may be automatically and/or manually removed from the display.

Figure 4:
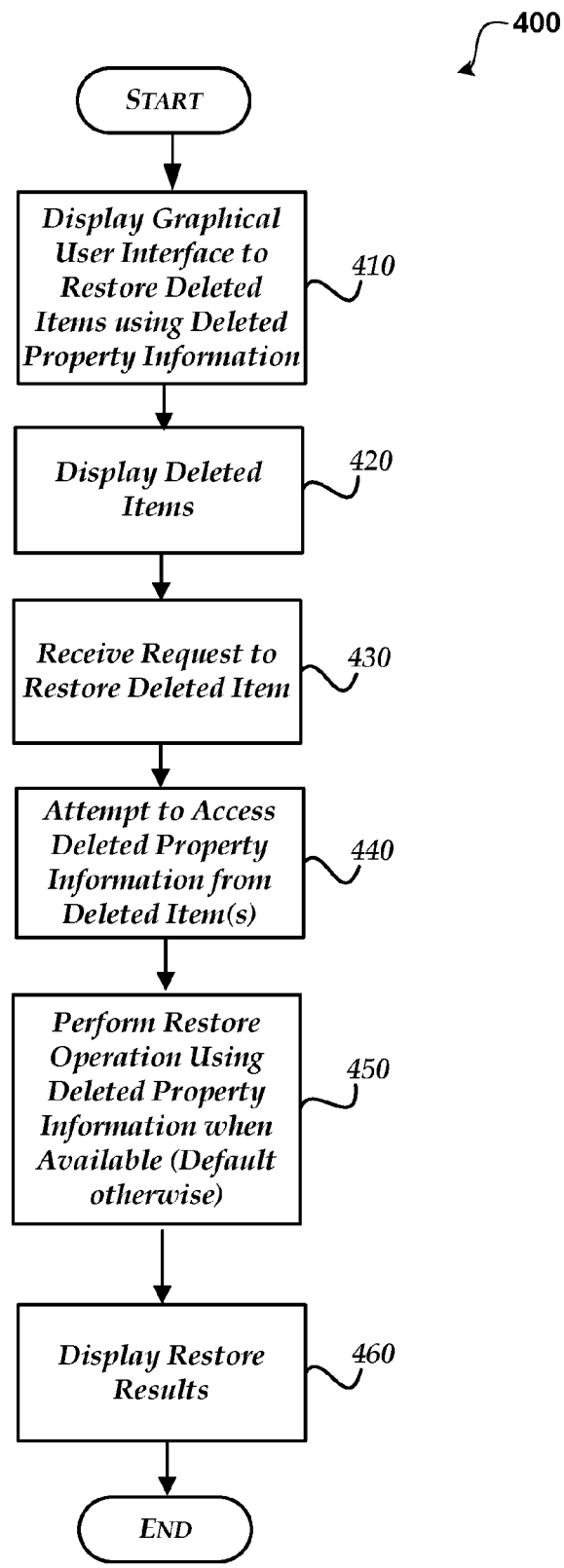
FIG. 4 shows a process for restoring deleted items using deleted property information when available.
Figure 5:
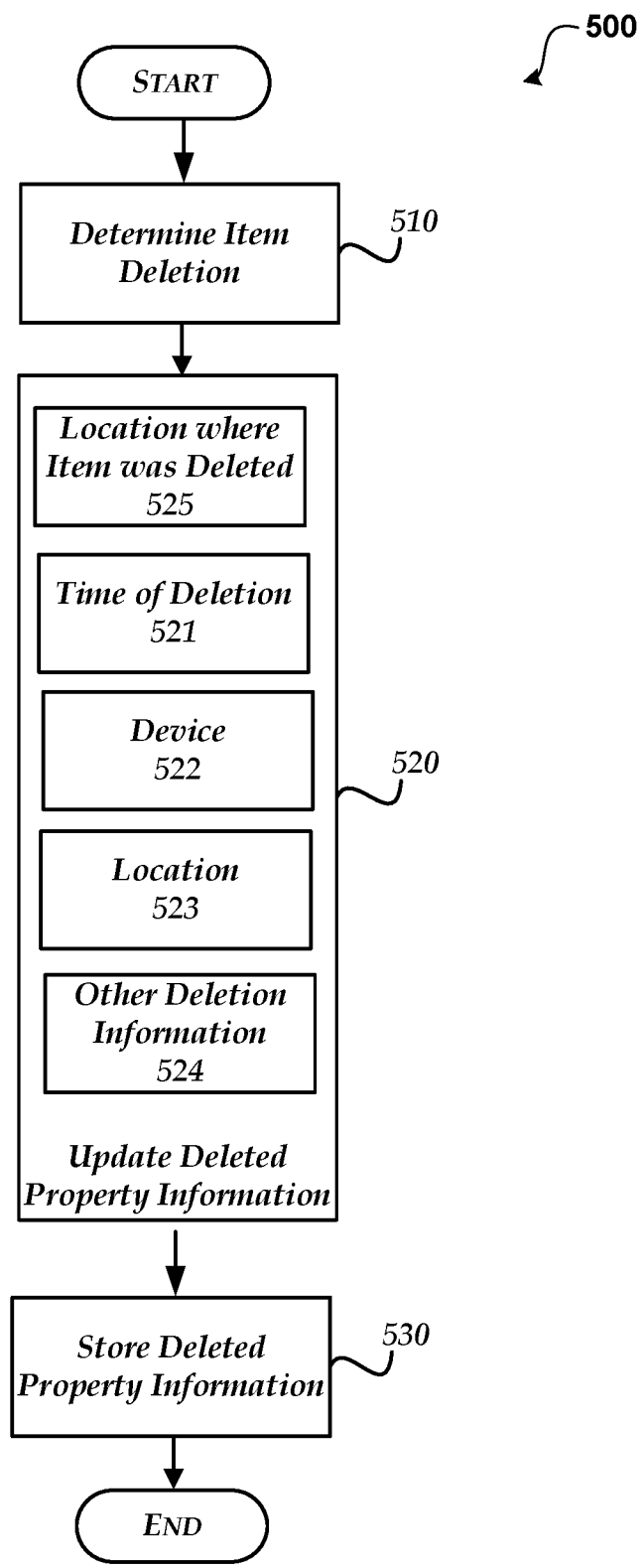
FIG. 5 shows a process for storing deleted property information when an item is deleted.

FIGS. 4-5 show illustrative processes for restoring deleted electronic messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

FIG. 4 shows a process for restoring deleted items using deleted property information when available.

After a start operation, the process 400 flows to operation 410, where a graphical user interface is displayed to interact with and restore deleted items. According to an embodiment, the items are electronic messages. For example, the electronic messages may be one or more of: email messages, SMS, MMS, and the like). The graphical user interface includes different user interface elements for interacting with the deleted items. For example, user interface elements may be used to sort electronic messages (e.g. oldest to newest, newest to oldest, within a range, deleted on a particular device(s), deleted at a particular location, . . . ), restore deleted items, create/fire rules using the deleted property information, filter deleted items and the like.

Moving to operation 420, the deleted items are displayed. The messages may be displayed in a list, arranged as threads, and/or arranged in different manners. The messages may be displayed by a client based application and/or by a server based application (e.g. enterprise, cloud based). According to an embodiment, the deleted items are initially displayed in the GUI from the newest deleted items (e.g. most recently deleted) to the oldest deleted items.

Flowing to operation 430, a request is received to restore a deleted item. The request may be received through the GUI and/or through some other method. For example, the request may be automatically generated in response to a rule being fired.

Transitioning to operation 440, deleted property information for the deleted item is attempted to be accessed. In some situations, the deleted item may not have deleted property information that specifies a location where the item was deleted. All/portion of the deleted property information may be accessed. For example, the location of where the item was deleted from may be accessed to restore the deleted item without accessing any other deleted property information that is stored for the item. Similarly, the time of deletion for each deleted item may be used to sort the deleted items according to the time of deletion without accessing the location information. When the deleted property information does not exist and/or does not include the location information for the deleted item, a default location is used to restore the deleted item. The default location may be a user-defined location and/or predefined by an application/service. According to an embodiment, the default location is the "Inbox" for the messaging application.

Moving to decision operation 450, the restore operation is performed. The deleted item is restored to the selected location (e.g. the location where the item was deleted, the default location, or a different selected location).

Transitioning to operation 460, the results of performing the restore operation are displayed. For example, the display may be updated to show where the deleted message was restored to and the deleted items may be updated to remove the display of the deleted message.

The process then moves to an end operation and returns to processing other actions.

FIG. 5 shows a process for storing deleted property information when an item is deleted.

After a start operation, the process 500 flows to operation 510, where a determination is made that an item is deleted. The item may be deleted manually (e.g. upon a user selection) and/or automatically (e.g. a rule fires that deletes certain items).

Moving to operation 520, deleted property information for the deleted item is updated. The location of where the item was deleted from 525 is updated. Location information 525 identifies a location of where the item resided when it was deleted. The location may be a path to the location, a name of the location, and/or some other identifier. The location may also include a user friendly name that is displayed to one or more uses. Other deleted property information may be associated with the deleted item such that it may be used at a later time. For example, one or more of the following may be determined: a time of deletion 521;

a device used to delete the item 522; a device where the deleted item was stored 522; and a location where a user was when the item was deleted 523. Other deletion information 524 may also be stored (e.g. application associated with the deleted item, application last used to access the deleted item, . . . ).

Flowing to operation 530, the deleted property information is stored. According to an embodiment, the deleted property information is stored as one or more properties that is stored in the metadata for the deleted item. According to an embodiment, the deleted properties and corresponding values may be viewed by a user through a user interface and/or accessed programmatically.

The process then moves to an end operation and returns to processing other actions.

Figure 6:
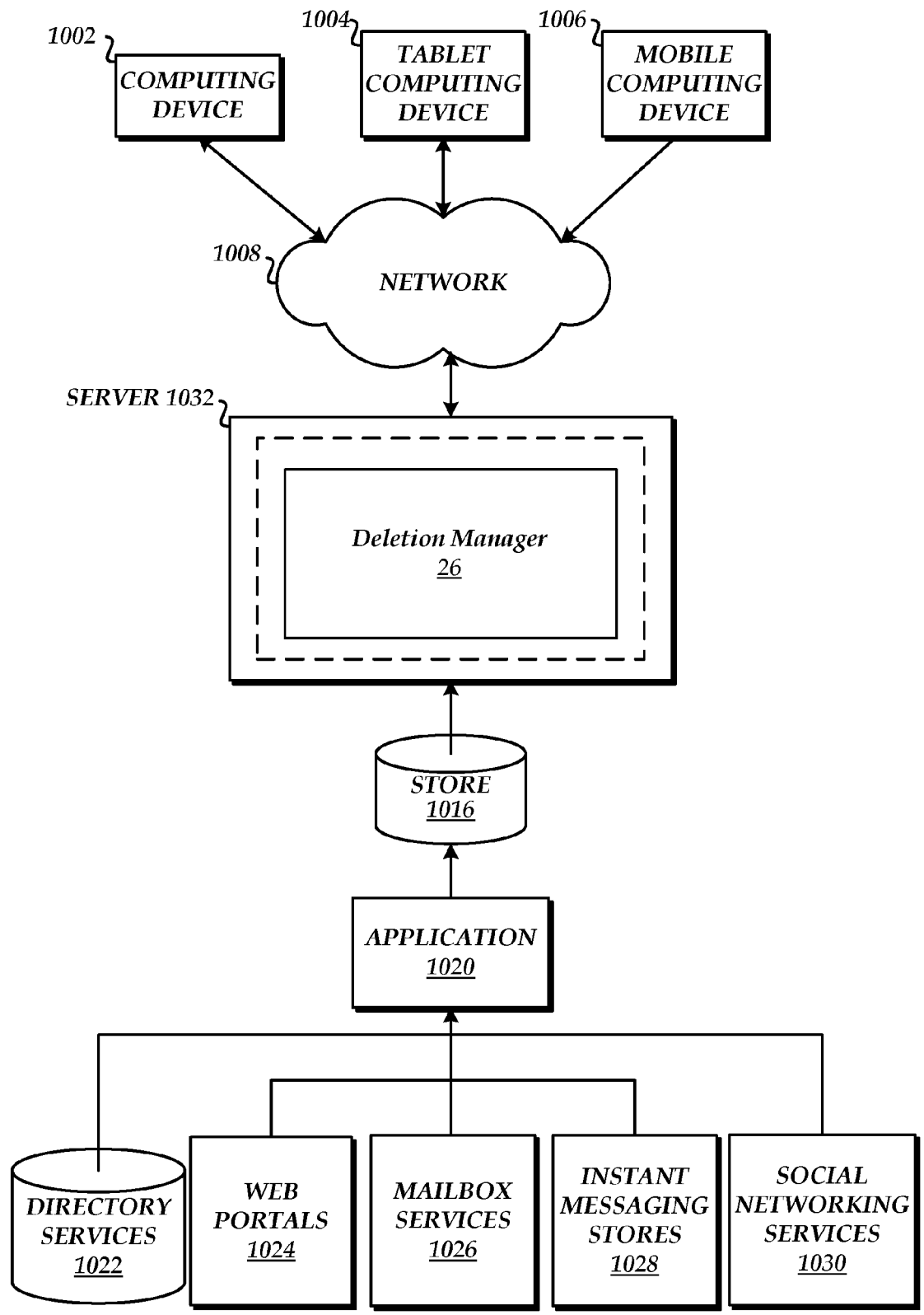
FIG. 6 illustrates a system architecture used in restoring deleted electronic messages.

FIG. 6 illustrates a system architecture used in restoring deleted electronic messages, as described herein. Content used and displayed by the application (e.g. application 1020) and the deletion manager 26 may be stored at different locations. For example, application 1020 may use/store data using directory services 1022, web portals 1024, mailbox services 1026, instant messaging stores 1028 and social networking sites 1030. The application 1020 may use any of these types of systems or the like. A server 1032 may be used to access sources and to prepare and display electronic messages. For example, server 1032 may access electronic messages including deleted electronic messages for application 1020 to display at a client (e.g. a browser or some other window) and restore from a client. As one example, server 1032 may be a web server configured to provide messaging services (e.g. email, text messages, IM messages, and the like) to one or more users. Server 1032 may use the web to interact with clients through a network 1008. Server 1032 may also comprise an application program (e.g. a messaging application). Examples of clients that may interact with server 1032 and a presentation application include computing device 1002, which may include any general purpose personal computer, a tablet computing device 1004 and/or mobile computing device 1006 which may include smart phones. Any of these devices may obtain content from the store 1016.

Figure 7:
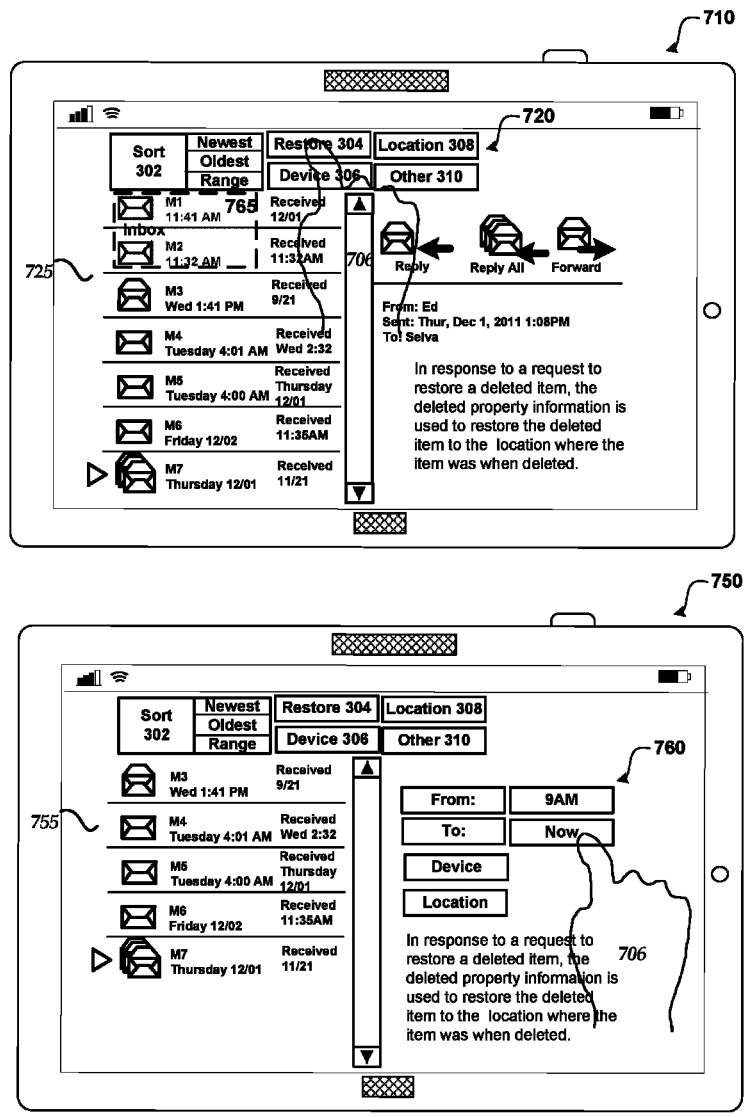
FIGS. 7-9 show exemplary displays illustrating restoring deleted messages using deleted property information that includes location information.
Figure 8:
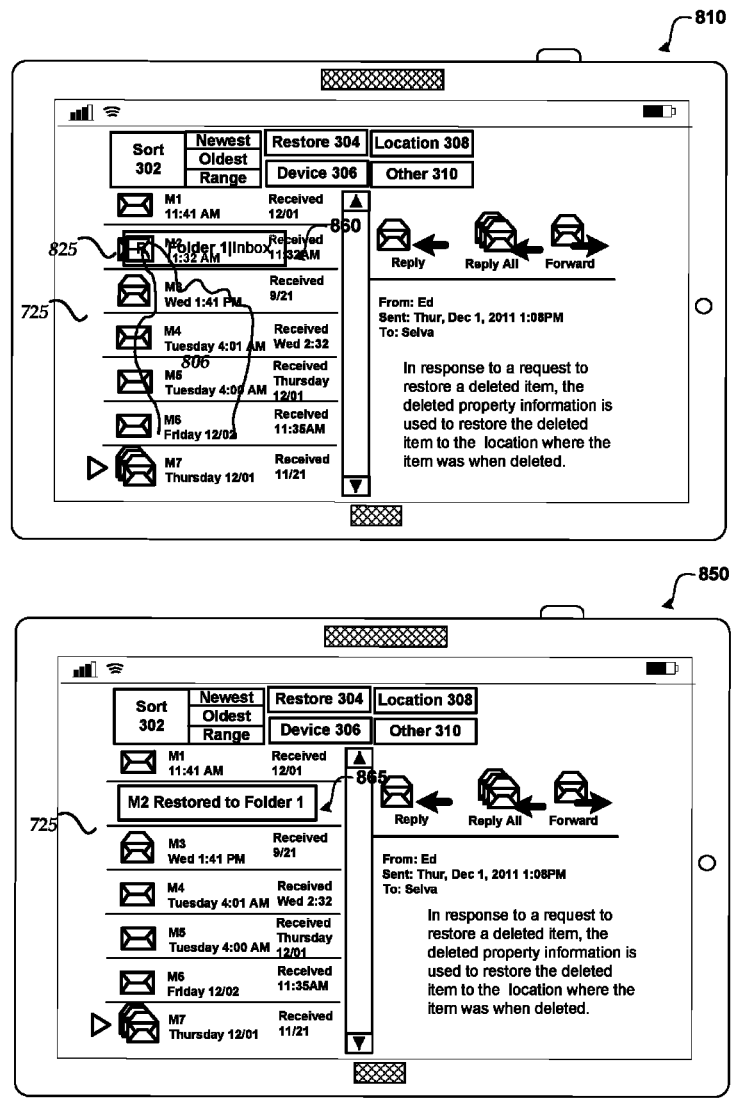
Figure 9:
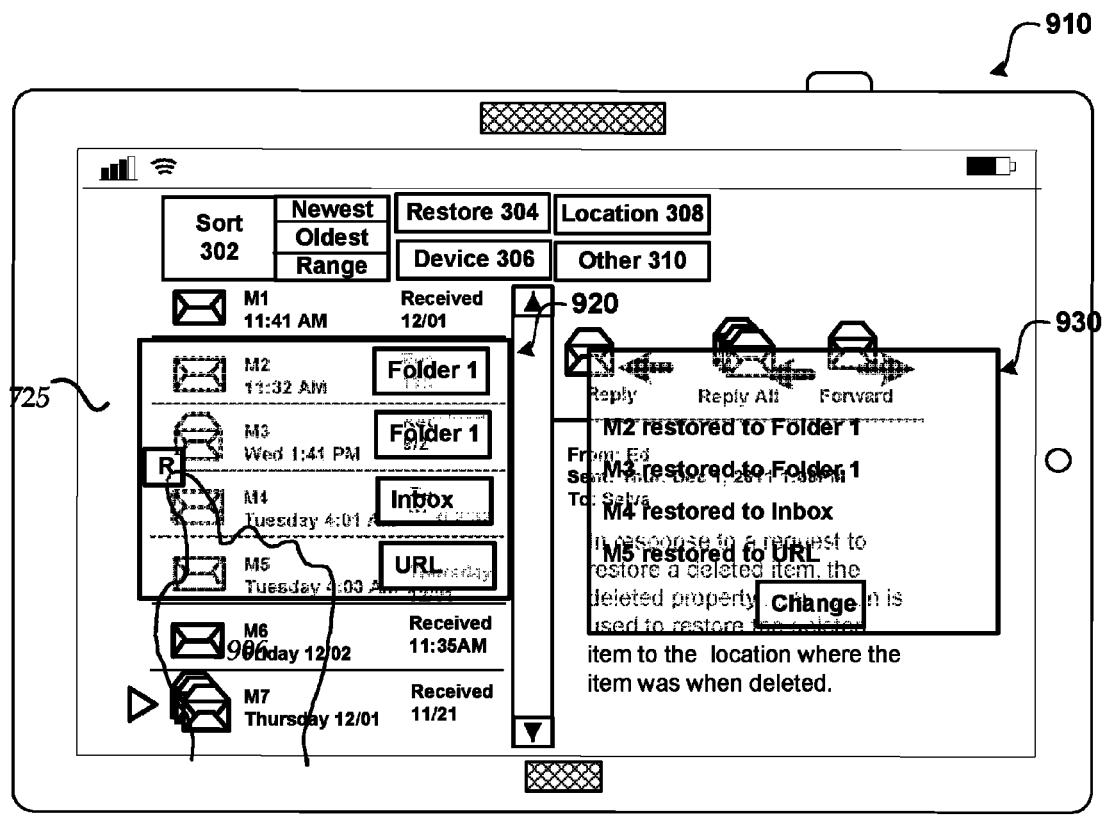

FIGS. 7-9 show exemplary displays illustrating restoring deleted messages using deleted property information that includes location information. The examples shown herein are for illustration purposes and not intended to be limiting.

FIG. 7 shows an exemplary landscape slate display showing restoring one or more deleted electronic messages.

Display 710 shows a display showing a list 725 of deleted electronic messages that are initially displayed in the order from most recently deleted to oldest deleted. As described herein, the deleted electronic messages may be displayed using other sorting/filtering values. As illustrated, user 706 is selecting Restore operation 304 to restore deleted items that meet one or more specified conditions.

Display 750 shows user 706 entering values 760 that are used for determining the deleted electronic messages to restore. As illustrated, user 706 has entered to restore the items that were deleted between 9 AM today and the current time. Other times may be entered (e.g. items within the last X minutes/days) as well as other filtering information may be entered to determine what items to restore (e.g. restore items deleted on device 1 from yesterday, restore items deleted within the last week that were deleted in Seattle). After the user has entered the desired parameter(s), the items are restored using the deleted property information for the electronic message when available. A preview (e.g. preview 765) may be displayed to show the determined items to restore before restoring the items. For example, the identified items may be displayed differently within the same window (765) and/or displayed in a different window (not illustrated). After restoring the determined items (in this example, items M1 and M2), list 755 shows the remaining deleted items. As discussed herein, the display may be updated to indicate where the deleted item(s) was restored.

FIG. 8 shows an exemplary landscape slate display showing interaction with deleted electronic messages and selecting a delete item to restore.

Display 810 shows a display showing a list 725 of deleted electronic messages that are initially displayed in the order from most recently deleted to oldest deleted. As illustrated, user 806 is hovering over message 865. In response to hovering over a message, a restore user interface element 860 is displayed. Restore user interface element 860 shows a restore operation (R) and a location to restore that is determined from the deleted property information "Folder 1" and a default location "Inbox" that may be selected to restore the deleted item. In the current example, restore user interface element 860 preselects the location as determined by the deleted property information "Folder 1." When the user selects the "R" option, the message is restored.

Display 850 shows display 810 after restoring message M2 (825). As illustrated, message 865 is displayed that shows the user the location of where the message was restored. In the current example, the message is restored to Folder 1 as determined by the deleted property information that is associated with the message. Message 865 may be displayed for a predetermined time before it is removed from the screen and/or removed manually from the screen (e.g. a user selecting message 865 and/or selecting some other location in display 850).

FIG. 9 shows an exemplary landscape slate display showing selecting and restoring a group of deleted electronic messages.

Display 910 shows a display showing a list 725 of deleted electronic messages that are initially displayed in the order from most recently deleted to oldest deleted. As illustrated, user 906 is selecting a group of four deleted messages to possibly restore. In response to the selection, UI 920 is displayed that shows the user where each of the deleted messages will be restored to as well as a restore option "R" that may be selected to restore the messages.

In response to user 906 selecting the restore option, the selected messages are restored to the determined locations. UI 930 provides the user with the location of where the deleted messages where restored along with a "Change" option that may be used to undo/change one or more of the restored messages. For example, a user may use the change option to undo a restore for al/portion of the messages and/or change a location of where all/portion of the deleted messages are restored.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for restoring deleted items, comprising:
causing a list of deleted calendar entries to be displayed within a graphical user interface;
receiving a selection of the deleted calendar entries;
in response to receiving the selection, accessing deleted property information for the selected deleted calendar entries, wherein the deleted property information includes location information defining a network location of where the selected deleted calendar entries were deleted, a time of deletion for the selected deleted calendar entries, and a geographical location of a device corresponding to a location of the device when the selected deleted calendar entries were deleted;
filtering the selected deleted calendar entries based on a time range of deletion and a specific geographical location;
in response to accessing the deleted property information and filtering the selected deleted calendar entries, causing the location information for the filtered deleted calendar entries to be displayed, and providing a link;
receiving a request, via the link, to restore at least one of the filtered deleted calendar entries to the network location;
restoring the at least one filtered deleted calendar entry to the network location; and
causing to be displayed, within the graphical user interface, a message specifying the network location.

2. The method of claim 1, wherein the deleted property information is stored as a property of the deleted calendar entries in response to the deleted calendar entries being deleted.

3. The method of claim 2, wherein restoring the at least one filtered deleted calendar entry comprises restoring the at least one filtered deleted calendar entry to the network location when the deleted property information exists and restoring the at least one filtered deleted calendar entry to a default location when the deleted property information does not exist.

4. The method of claim 2, wherein the deleted property information further comprises an application associated with the deleted calendar entries.

5. The method of claim 2, wherein the deleted property information further comprises an application that was last used to access the deleted calendar entries.

6. The method of claim 1, further comprising causing the at least one filtered deleted calendar entry to be displayed in a list view comprising the at least one filtered deleted calendar entry.

7. The method of claim 6, further comprising causing a user friendly name for the network location to be displayed within the graphical user interface.

8. The method of claim 1, further comprising causing user interface elements for sorting the selected deleted calendar entries to be displayed within the graphical user interface using the time of deletion of the selected deleted calendar entries.

9. A computer-readable storage device, having computer-executable instructions that, when executed by a processor, cause the processor to perform a method for restoring deleted calendar entries using a time of deletion, the method comprising:
causing a list of deleted calendar entries to be displayed within a graphical user interface;
receiving a selection of the deleted calendar entries;
in response to receiving the selection, accessing deleted property information for the selected deleted calendar entries, wherein the deleted property information includes location information defining a network location of where the selected deleted calendar entries were deleted, the time of deletion for the selected deleted calendar entries, and a geographical location of a device corresponding to a location of the device when the selected deleted calendar entries were deleted;
filtering the selected deleted calendar entries based on a time range of deletion and a specific geographical location;
in response to accessing the deleted property information and filtering the selected deleted calendar entries, causing the location information for the filtered deleted calendar entries to be displayed, and providing a link;
receiving a request, via the link, to restore at least one of the filtered deleted calendar entries to the network location; and
restoring the at least one filtered deleted calendar entry to the network location; and
causing to be displayed, within the graphical user interface, a message specifying the network location.

10. The computer-readable storage device of claim 9, wherein the deleted property information is stored as a property of the deleted calendar entries in response to the deleted calendar entries being deleted.

11. The computer-readable storage device 10, wherein restoring the at least one filtered deleted calendar entry comprises restoring the at least one filtered deleted calendar entry to the network location when the deleted property information exists and restoring the at least one filtered deleted calendar entry to a default location when the deleted property information does not exist.

12. The computer-readable storage device of claim 10, wherein the deleted property information further comprises an application associated with the deleted calendar entries.

13. The computer-readable storage device of claim 10, wherein the deleted property information further comprises an application that was last used to access the deleted calendar entries.

14. The computer-readable storage device of claim 9, the method further comprising displaying the at least one filtered deleted calendar entry in a list view comprising the at least one filtered deleted calendar entry.

15. The computer-readable storage device of claim 14, the method further comprising causing a user friendly name for the network location to be displayed within the graphical user interface.

16. A system for restoring deleted electronic messages, comprising:
a display;
a network connection that is coupled to a network;
a processor and a computer-readable medium;
an operating environment stored on the computer-readable medium and executing on the processor; and
a process operating under the control of the operating environment and operative to perform a method, the method comprising:
displaying a list of deleted calendar entries in a deleted items folder within a graphical user interface;
receiving a selection of the deleted calendar entries;
in response to the selection, accessing deleted property information for the selected deleted calendar entries, wherein the deleted property information includes location information defining a network location of where the selected deleted calendar entries were deleted, a time of deletion for the selected deleted calendar entries, and a geographical location of a device corresponding to a location of the device when the selected deleted calendar entries were deleted;

filtering the selected deleted calendar entries based on a time range of deletion and a specific geographical location;

in response to accessing the deleted property information and filtering the selected deleted calendar entries, displaying, for the filtered deleted calendar entries the network location, the time of deletion for the filtered deleted calendar entries and the geographical location of the device corresponding to the location of the device when the filtered deleted calendar entries were deleted, and providing a link;

receiving a request, via the link, to restore at least one of the filtered deleted calendar entries to the network location;

restoring the at least one filtered deleted calendar entry to the network location; and causing to be displayed, within the graphical user interface, a message specifying the network location.

17. The system of claim 16, the method further comprising displaying the at least one filtered deleted calendar entry in a list view comprising the at least one filtered deleted calendar entry.

18. The system of claim 17, the method further comprising displaying a user friendly name for the network location within the graphical user interface.

19. The system of claim 16, wherein the deleted property information is stored as a property of the deleted calendar entries in response to the deleted calendar entries being deleted.

* * * * *